(12) United States Patent
Bouillot et al.

(10) Patent No.: US 9,109,621 B2
(45) Date of Patent: Aug. 18, 2015

(54) CONNECTING ROD FOR AERONAUTICAL MECHANISM AND AERONAUTICAL MECHANISM COMPRISING SUCH A CONNECTING ROD

(75) Inventors: Franck Bouillot, Valence (FR); Cedric Milord, Marches (FR)

(73) Assignee: FLY BY WIRE SYSTEMS FRANCE, Saint-Vallier (FR)

( * ) Notice: Subject to any disclaimer, the term of this patent is extended or adjusted under 35 U.S.C. 154(b) by 235 days.

(21) Appl. No.: 13/819,834
(22) PCT Filed: Aug. 30, 2011
(86) PCT No.: PCT/FR2011/051988
§ 371 (c)(1), (2), (4) Date: Jul. 15, 2013
(87) PCT Pub. No.: WO2012/028821
PCT Pub. Date: Mar. 8, 2012

(65) Prior Publication Data
US 2013/0283942 A1    Oct. 31, 2013

(30) Foreign Application Priority Data
Aug. 30, 2010 (FR) ...................... 10 56867

(51) Int. Cl.
F16C 7/04 (2006.01)
B64D 45/00 (2006.01)
G01L 5/10 (2006.01)

(52) U.S. Cl.
CPC .............. *F16C 7/04* (2013.01); *B64D 45/0005* (2013.01); *G01L 5/101* (2013.01); *B64D 2045/001* (2013.01); *Y10T 74/18568* (2015.01); *Y10T 74/2144* (2015.01)

(58) Field of Classification Search
CPC ....... F16C 7/04; G01L 5/101; B64D 45/0005; B64D 2045/001; Y10T 74/2144; Y10T 74/18568; Y02T 50/44; B64C 13/28; B64C 9/22; B64C 9/02; B64C 9/16
USPC .............. 73/802, 862.391, 862.392, 862.541; 244/99.3
See application file for complete search history.

(56) References Cited

U.S. PATENT DOCUMENTS 5,113,710 A  *  5/1992  Wolfbauer, III ......... 73/862.541
5,193,408 A  *  3/1993  Fukui et al. .................. 74/89.35

(Continued)

FOREIGN PATENT DOCUMENTS

EP             2067697 A1      6/2009

OTHER PUBLICATIONS

International Search Report, dated Nov. 2, 2011, which issued during the prosecution of International Patent Application No. PCT/FR2011/051988, of which the present application is the national phase.

*Primary Examiner* — Valentina Xavier
(74) *Attorney, Agent, or Firm* — Troutman Sanders LLP

(57) ABSTRACT

A connecting rod for an aeronautical actuator system, having one shaft transmitting forces applied in tension and/or compression along a longitudinal axis of the rod. When the connecting rod is in service, an elastically deformable element connected to the shaft is configured to react to the forces applied to the shaft, and displays elastic deformation when effected by these forces. The deformable element has a peripheral part rigidly connected to a member of the rod in which the shaft is slidably mounted. Measurement means associated with the deformable element determine the forces. The measurement means is partially housed in the deformable element. The deformable element includes a central part elongated along the longitudinal axis, which is rigidly connected to the shaft and in which the measurement means are at least partially housed. An intermediate part runs transversally to the central part and connects the central part and the peripheral part.

12 Claims, 6 Drawing Sheets

(56) References Cited

U.S. PATENT DOCUMENTS

| | | | |
|---|---|---|---|
| 6,279,407 B1 * | 8/2001 | Park et al. | 73/862.391 |
| 6,311,566 B1 * | 11/2001 | Ferguson | 73/802 |
| 2005/0178215 A1 | 8/2005 | Mayer et al. | |
| 2007/0277625 A1 | 12/2007 | Mayer et al. | |

* cited by examiner

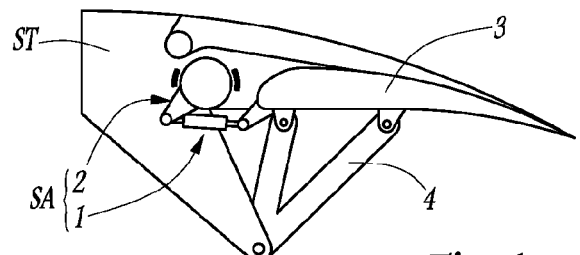
Fig.1
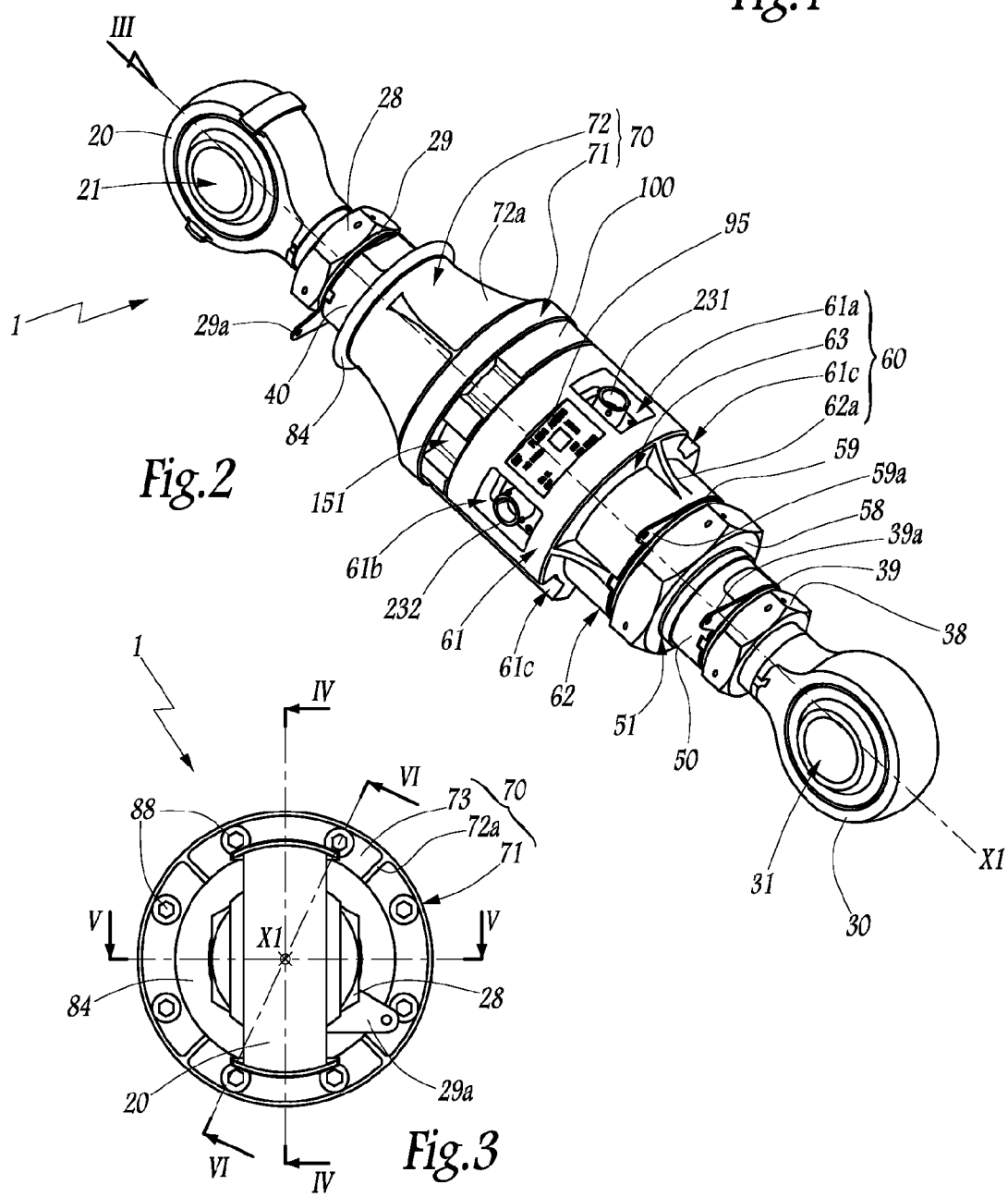
Fig.2
Fig.3

CONNECTING ROD FOR AERONAUTICAL MECHANISM AND AERONAUTICAL MECHANISM COMPRISING SUCH A CONNECTING ROD

CROSS REFERENCE TO RELATED APPLICATIONS

The present application is the National Stage of International Application No. PCT/FR2011/051988 filed on Aug. 30, 2011, which published as WO 2012/028821 on Mar. 8, 2012. The PCT application claims priority to French Application No. 10 56867 which was filed on Aug. 30, 2010. The above applications are incorporated herein by reference in their entirety.

FIELD OF THE INVENTION

This invention relates to a connecting rod for an aeronautical mechanism. The invention also relates to an aeronautical mechanism comprising such a connecting rod, in particular a flap actuating system. The field of the invention is that of aeronautical construction, which requires an evaluation of the mechanical constraints that a mechanism is subjected to and, in particular, that the connecting rod or rods that it is comprised of are subjected to.

BACKGROUND

Conventionally in the field of mechanical engineering, parts subjected to forces of tension and/or of compression can include an elastically deformable element associated with a load cell, in such a way as to measure an elastic deformation in order to evaluate these forces. In order to obtain an accurate measurement, the amplitude of the elastic deformation must be relatively large under the forces commonly sustained in normal operating mode.

However, a connecting rod of an aeronautical mechanism is dimensioned to support critical forces, in a failing operating mode, that are much higher than the forces that are applied in normal operation. However, such critical forces risk generating a plastic deformation of the elastically deformable element, which renders it useless and requires it to be replaced in order to again be able to take measurements of forces.

EP-A-2 067 697 describes such a connecting rod for aeronautical construction, including at least one shaft intended to transmit forces applied essentially in tension and/or in compression when the connecting rod is in service. An elastically deformable element is integral with the shaft in order to react to these forces, and configured to be deformed elastically under the effect of these forces. One or several load cells are associated with the deformable element in such a way as to measure the elastic deformation in order to evaluate the forces. Moreover, the connecting rod has a safety member integral with the deformable element and at a distance from the shaft when the connecting rod is at rest. This safety member is provided in order to limit the movements of the shaft when the elastic deformation exceeds a determined limit, in such a way as to transmit the excess portion of the forces. Such a safety member therefore makes it possible to protect the elastically deformable element, by "short circuiting" it when the forces exceed its elastic limit. The element protected as such can have an elastic deformation of large amplitude during normal operation, in such a way as to take accurate measurements of forces.

However, such a connecting rod is not entirely satisfactory. Indeed, in order to take accurate measurements, the connecting rod must include a substantial number of strain gauges, more preferably at least four gauges. Because of this, the electronic post-processing chain associated with these gauges is complex. Moreover, these gauges are generally glued onto the deformable element. However, the glue does not resist well to ageing in the operating conditions of the connecting rod and of the deformable element. As such, the use of this glue creates a substantial sealing constraint and reduces the reliability of the measurements over time.

US-A-2005 178 215 describes another connecting rod for aeronautical construction. This connecting rod includes a spring which is connected to a shaft and configured, on the one hand, to react to the forces applied to the shaft and, on the other hand, to have an elastic deformation under the effect of these forces. The connecting rod further comprises a sensor associated with the spring and configured in order to determine the forces. The sensor is housed at its two ends in the spring. The use of such a spring is not entirely satisfactory, in particular in terms of measurement accuracy.

The purpose of this invention is to propose a connecting rod that makes it possible to take measurements of forces simply, accurately and reliably, during its entire life cycle.

For this purpose, the invention relates to a connecting rod for an aeronautical actuator system, having at least one shaft configured to transmit forces applied essentially in tension and/or in compression along a longitudinal axis of the connecting rod when the connecting rod is in service, an elastically deformable element which is connected to the shaft and configured, on the one hand, to react to the forces applied to the shaft and, on the other hand, to have an elastic deformation under the effect of these forces, with the deformable element including a peripheral part which is rigidly connected to a member of the connecting rod where the shaft is slidably mounted, and measurement means associated with the deformable element and configured to determine the forces, with the measurement means being at least partially housed in the deformable element.

According to the invention the deformable element has a central part which is elongate along the longitudinal axis of the connecting rod, which is rigidly connected to the shaft and in which the measurement means are at least partially housed, and an intermediate part which runs transversally to the central part and which connects the central part and the peripheral part.

As such, the invention makes it possible to improve the accuracy and the reliability of the measurement system. In particular, the measurement means are measurement means for displacement, configured to determine the forces using the displacement of the deformable element. This deformable element has the form of a diaphragm, of which the structure and the deformations are well controlled. Due to the relative arrangement of the measurement means and of the deformable element, these measurements can be taken in a reactive manner during the deformations of this element. Moreover, the risk of the measurement means separating from the deformable element is reduced. In other words, the measurement system has improved resistance to ageing. Also, this measurement system operates in a simple manner, without requiring a complex electronic post-processing chain.

According to other advantageous characteristics of the invention, taken separately or in combination, an example is: the central part, the peripheral part and the intermediate part of the deformable element are integrally formed; the measurement means include at least one linear displacement sensor, this sensor being at least partially housed in the deformable element; the measurement means include at least two linear displacement sensors positioned parallel to one another on either side of the longitudinal axis of the connecting rod, each sensor being at least partially housed in the deformable element; or each sensor is rigidly fixed to the deformable element and mobile in a complementary element configured to transform a displacement measurement of the sensor into a value of forces applied to the deformable element; the measurement means are closer to the longitudinal axis of the connecting rod than to the periphery of the connecting rod; the shaft is arranged slidingly in the member which is rigidly connected to the peripheral part of the deformable element, such that a displacement of the shaft under the effect of the forces results in a displacement of the central part of the deformable element; the shaft includes means of abutment which are, on the one hand, at a distance from the member and from the deformable element when the connecting rod is at rest and, on the other hand, configured to limit the forces applied in traction and/or in compression on the deformable element when the elastic deformation exceeds a determined limit, in such a way as to transmit the excess portion of the forces; the deformable element is made of high-strength stainless steel or of titanium; the connecting rod comprises a central case and two units arranged symmetrically in relation to the case along its longitudinal axis, with each unit comprising a deformable element, a shaft and measurement means.

The invention also has for purpose an aeronautical mechanism including at least one connecting rod such as mentioned hereinabove. The connecting rod is interposed between a rotary actuator and a flap panel so as to transfer force from the rotary actuator and the flap panel. The aeronautical mechanism is configured to move the flap panel and hold it in extreme or intermediate positions.

BRIEF DESCRIPTION OF THE DRAWINGS

The invention shall be better understood when reading the following description, provided solely by way of a non-restricted example and in reference to the drawings wherein:

FIG. 1 is a diagrammatical representation of an aeronautical mechanism, having a rotary actuator fixed on the structure of an aircraft and connected to a flap panel via a connecting rod in accordance with the invention;

FIG. 2 is a perspective view of the connecting rod of FIG. 1;

FIG. 3 is an elevational view of the connecting rod according to the arrow III in FIG. 2;

DETAILED DESCRIPTION

Figure 4:
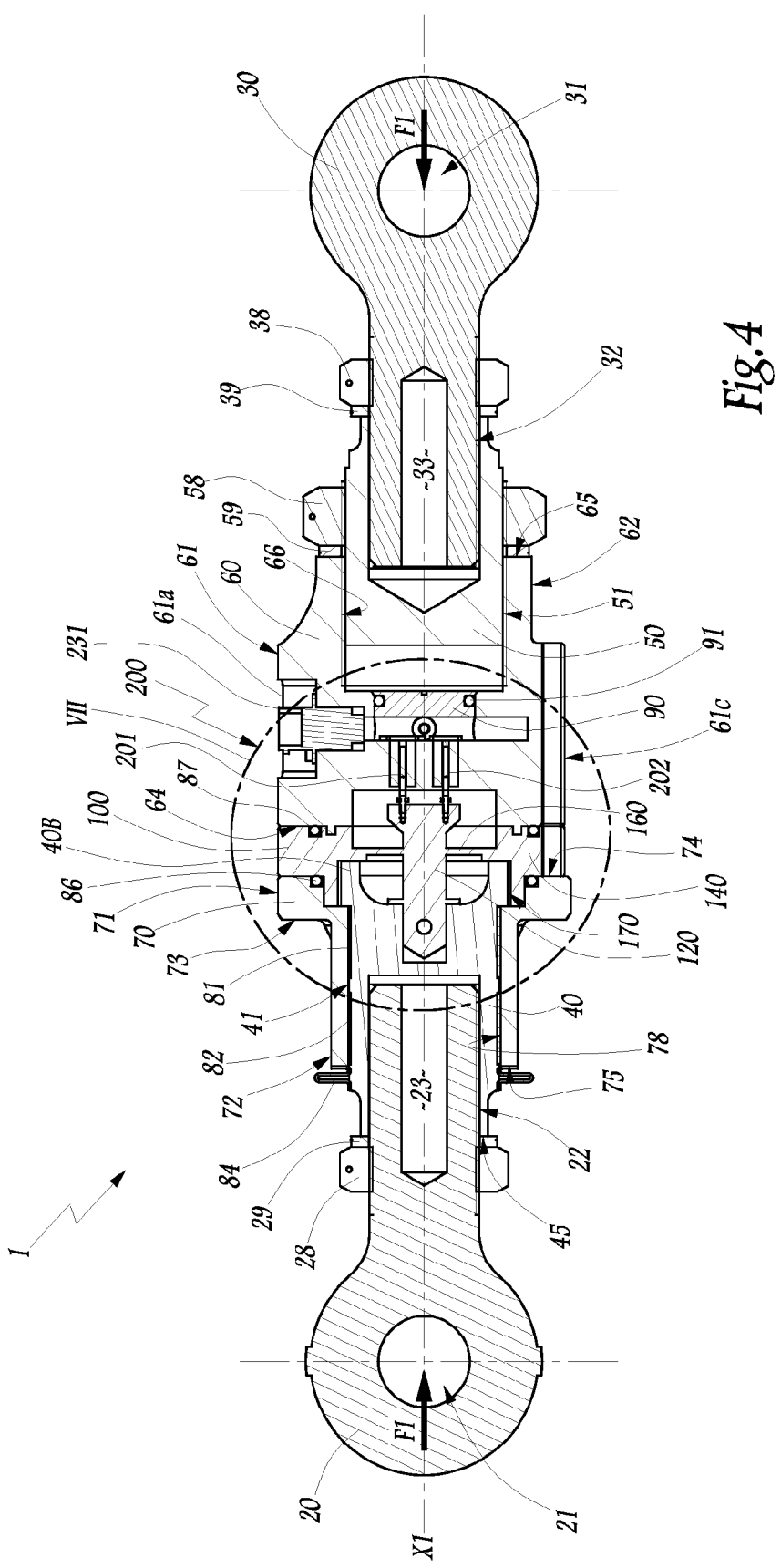
FIGS. 4, 5 and 6 are cross-sections, respectively according to the lines IV-IV, V-V and VI-VI in FIG. 3.

FIG. 1 shows an aeronautical mechanism in accordance with the invention, of the flap actuating system SA type, provided on an aircraft.

The actuating system SA has a connecting rod 1 and a rotary actuator 2, configured to move a flap panel 3. More precisely, the panel 3 can be moved and maintained by the system SA in or into various extreme or intermediate positions during the operation of the aircraft. The rotary actuator 2 is fixed on a structure element ST of the aircraft, while the flap panel 3 is connected to the structure element ST by a pivoting lever member 4. The connecting rod 1 is interposed between the actuator 2 and the flap panel 3, so as to transfer force from the actuator 2 to the panel 3.

FIGS. 2 to 9 show the connecting rod 1 in accordance with examples of the invention.

The connecting rod 1 runs along a longitudinal axis X1 between two ends formed by respective tips 20 and 30, which are intended to be connected to the other elements of the aeronautical mechanism SA, i.e. the actuator 2 and the flap panel 3. For this purpose, each tip 20 or 30 is pierced with an open hole 21 or 31 intended to receive a complementary portion of one of these elements 3 or 4. Also, each tip 20 and 30 includes a central bore, respectively 23 and 33, over a portion of its length in order to reduce its mass.

The connecting rod 1 includes a first shaft 40 to which is made integral the tip 20 by means of a threading 22 and of a nut 28 pressing against a washer 29. Likewise, the connecting rod 1 has a second shaft 50 to which is made integral the tip 30 by means of a threading 32 and of a nut 38 pressing against a washer 39. Each washer 29 and 39 is, in an example, of the NORD-LOCK type (registered trademark), constituted of two identical washers with cams and teeth which prevent the nuts 28 and 38 from becoming loose, as well as a third washer provided with a protruding member, respectively 29a and 39a, intended to facilitate their locking and their handling.

The connecting rod 1 further has a diaphragm 100 interposed between a case 60 and a cover 70, which connect the shafts 40 and 50 together.

When the connecting rod 1 is in service, these elements 40, 50, 60, 70 and 100 are configured to transmit force from the tip 20 to the tip 30 and reciprocally. Such forces are applied substantially in tension or in compression. In the example of FIG. 4, the tips 20 and 30 are subjected to a compression force F1 which is applied along the axis X1.

The case 60 has two cylindrical surfaces 61 and 62 which run along the axis X1 and are connected by a transverse annular surface 63 perpendicular to the axis X1. The diameter of the surface 61 is greater than the diameter of the surface 62. Grooves 62a run between the surface 62 and the surface 63. The case 60 has a first annular end surface 64 which runs perpendicularly to the axis X1 on the side of the surface 61, and a second annular end surface 65 which runs perpendicularly to the axis X1 on the side of the surface 62. An annular element 64a is arranged protruding on the surface 64.

A threaded bore 66 runs from the surface 65 to the interior of the case 60 and is provided to receive the shaft 50, more precisely a threaded cylindrical surface 51 of the shaft 50. As such, the position of the shaft 50 in the case 60 can be adjusted then blocked using a nut 58 and a washer 59 pressing against the surface 65. This washer 59, in an example, is of the NORD-LOCK type (registered trademark), constituted of two identical washers with cams and teeth which prevent the nut 58 from becoming loose, as well as a third washer provided with a protruding member 59a intended to facilitate their locking and their handling.

In the surface 61 are delimited a first cup 61a wherein is arranged an electrical connector 231, a second cup wherein is arranged an electrical connector 232, as well as several grooves 61c running parallel to the axis X1. Also, a label 95 is arranged on the surface 61 between the cups 61a and 61b, provided to receive identification information for the connecting rod 1.

In an alternative not shown, the cups 61a and 61b, respectively having the connectors 231 and 232, are diametrically opposite in relation to the axis X1.

Figure 7:
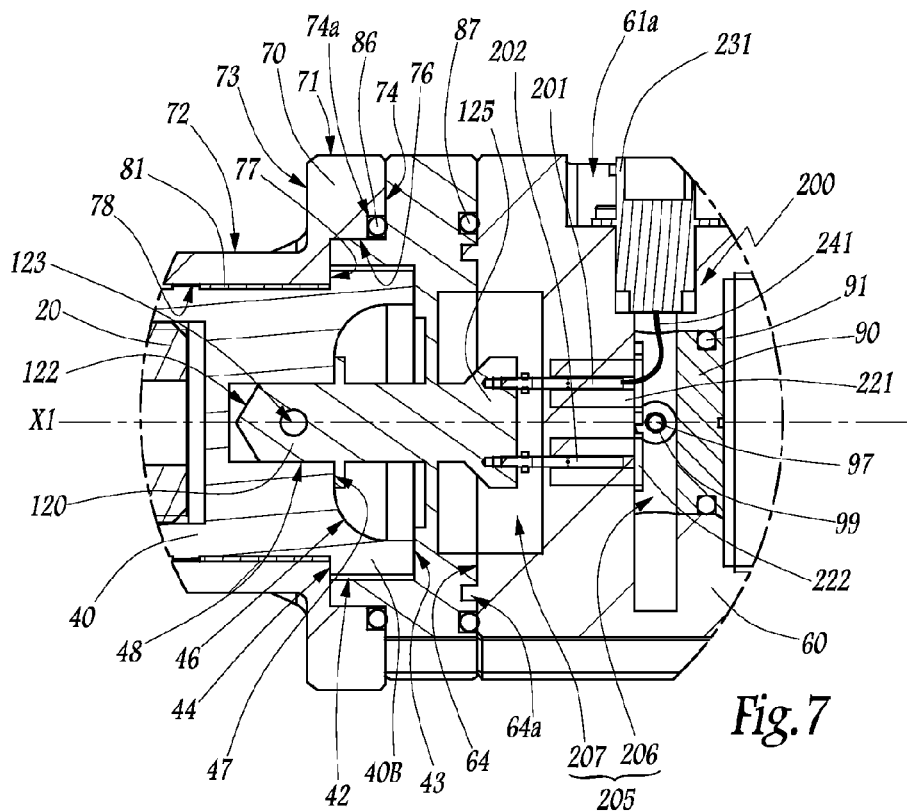
FIGS. 7 and 8 are views on a larger scale, respectively of the detail VII in FIG. 4 and of the detail VIII in FIG. 5.

As can be seen in FIGS. 4 and 7, the shaft 40 has two cylindrical surfaces 41 and 42 which run along the axis X1 and are connected by a transverse annular surface 44 perpendicular to the axis X1. The diameter of the surface 42 is greater than the diameter of the surface 41, while the length of the surface 41 is greater than the length of the surface 41. The shaft 40 also has a first annular end surface 43 which runs perpendicularly to the axis X1 on the side of the surface 42, and a second annular end surface 45 which runs perpendicularly to the axis X1 on the side of the surface 41 and against which the washer 29 is positioned. The shaft 40 also has a recess 46 arranged on the surface 43. A substantially planar transverse surface 47 is provided at the bottom of this recess 46. A cylindrical bore 48 runs from this surface 47 inside the shaft 40, in the direction of the surface 45. An orifice 49 runs radially to the axis X1 on either side of the shaft 40, passing through the surface 41 and the bore 48.

As can be seen in FIGS. 4 and 7, the cover 70 has two cylinder surfaces 71 and 72 which run along the axis X1 and are connected by a transverse annular surface 73. The diameter of the surface 71 is greater than the diameter of the surface 72. Grooves 72a run between the surface 72 and the surface 73. The cover 70 has a first annular end surface 74 which runs perpendicularly to the axis X1 on the side of the surface 71, and a second annular end surface 75 which runs perpendicularly to the axis X1 on the side of the surface 72. An annular recess 74a is arranged in the cover 70 exiting from the surface 74 and is provided in order to receive an O-ring 86. The cover 70 has passing through it a first interior bore 76 which runs from the surface 74 and by a second interior bore 78 which runs from the surface 75. These bores 76 and 78 are connected by a transverse surface 77, and the diameter of the bore 76 is greater than the diameter of the bore 78.

Figure 5:
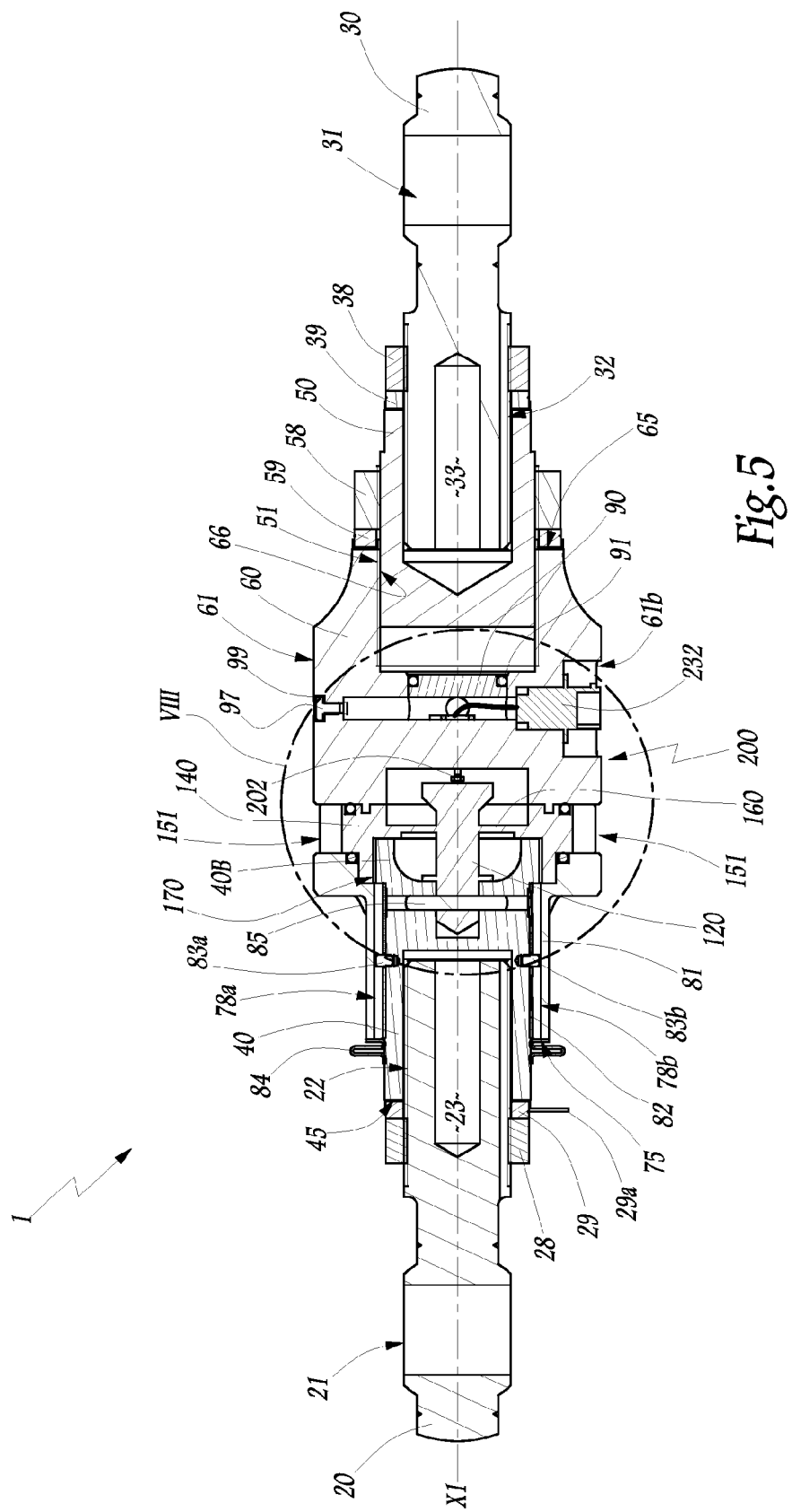

The shaft 40 is mounted in this bore 78 and blocked in rotation in relation to the cover 70 by the intermediary of two screws 83a and 83b, as can be seen in FIG. 5. Each screw 83a and 83b is housed in a groove, respectively 78a and 78b, of the cover 70, and penetrates into the shaft 40 perpendicularly to the axis X1. Also, two bearings 81 and 82 are positioned between the shaft 40 and the cover 70. More precisely, the bearings 81 and 82 are housed in the cylindrical surface 41 of the shaft 40. As such, the shaft 40 is capable of translating along the axis X1 inside the cover 70, with the bearings 81 and 82 which slide in the bore 78. An elastically deformable bellows 84 is welded between the end surface 75 of the cover 70 and the cylindrical surface 41 of the shaft 40, as such forming the seal between them.

Figure 9:
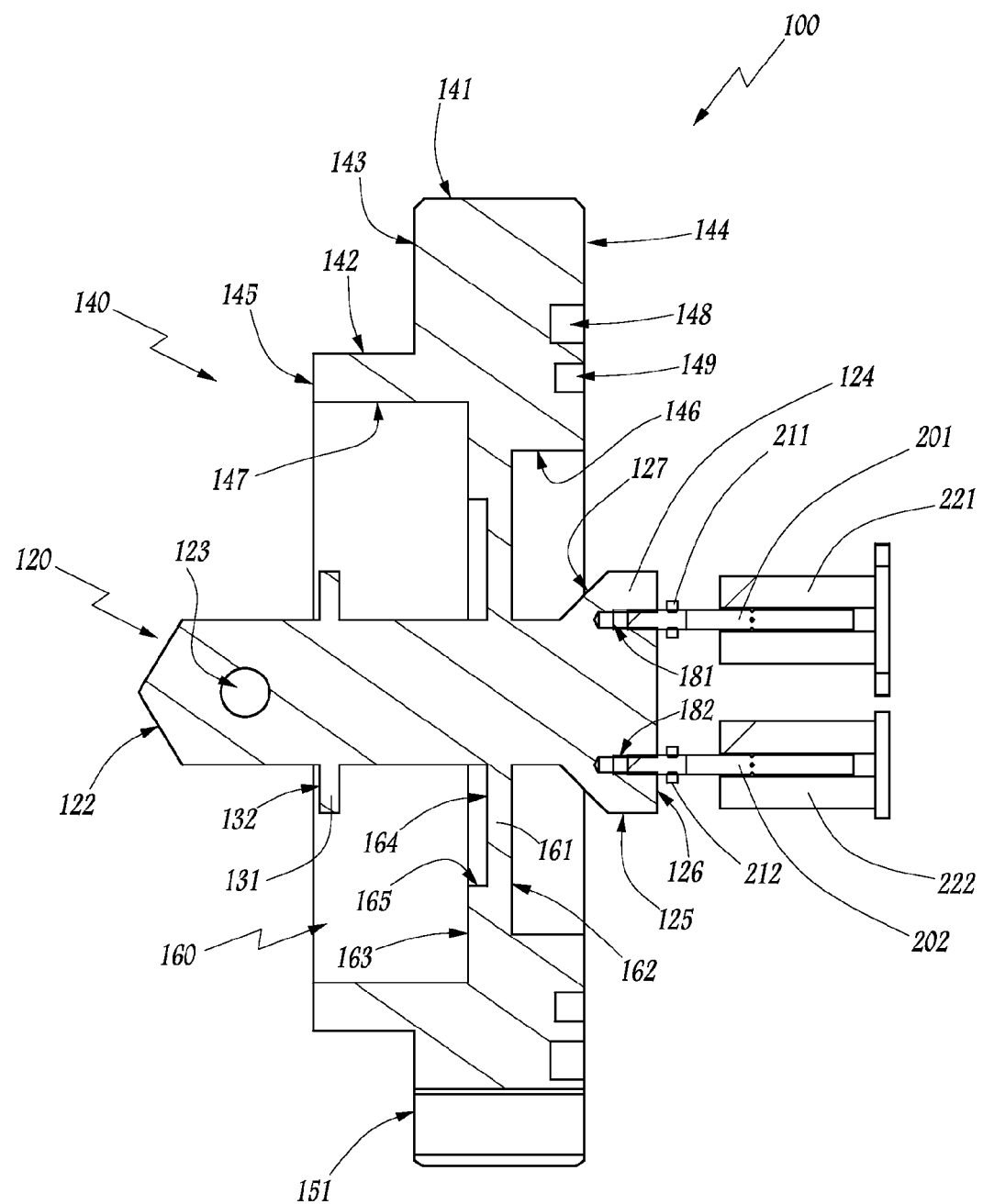
FIG. 9 is a view on a larger scale of FIG. 7, showing an elastically deformable element and measurement means belonging to the connecting rod.

As can be seen in particular in FIG. 9, the diaphragm 100 is formed of a central part 120 and of a peripheral part 140. The adjective "central" qualifies an element which is located close to the axis X1, while the adjective "peripheral" qualifies an element which is farther away from it.

The central part 120 has a cylindrical surface 121 elongate along the axis X1. This surface 121 has an end 122 with a reduction in diameter and an orifice 123 which runs transversally to the axis X1, as well as an opposite end 123 with an increase in diameter. More precisely, the end 124 has a cylindrical surface 125 which is connected to the cylindrical surface 121 by a tapered surface 127 inclined to 45°, and a transverse surface 126 which is centered on the axis X1 and runs from the surface 125 on the opposite to the surface 127. An annular collar 131 runs transversally to the axis X1 from the surface 121. In particular, this collar 131 has a transverse annular surface 132.

The shaft 40 is integral with the central part 120 by means of a pin 85. More precisely, this pin 85 is adjusted in the orifice 49 of the shaft 40 and in the orifice 123 which passes through the central part 120. Furthermore, the transverse surface 132 of the diaphragm 100 is in planar contact with the transverse surface 47 of the shaft 40, while the cylindrical surface 121 of the diaphragm 100 is adjusted in the bore 48 of the shaft 40. As such, the shaft 40 can transmit to the diaphragm 100 forces of compression and/or of traction, such as the force F1.

The peripheral part 140 has a first cylindrical surface 141 and a second cylindrical surface 142 which run along the axis X1 and are connected by a transverse surface 143. The diameter of the surface 141 is greater than the diameter of the surface 142. A transverse surface 144 runs from the surface 141 in the direction of the axis X1, while a transverse surface 145 runs from the surface 142 in the direction of the axis X1. A cylindrical bore 147 runs from the surface 145 in the direction of the surface 144, while a cylindrical bore 146 runs from the surface 144 in the direction of the surface 145. The diameter of the surface 147 is greater than the diameter of the surface 146. Furthermore, the surface 144 has a first annular housing 148 intended to receive an O-ring 87, as well as a second annular housing intended to receive the annular element 64a protruding from the case 60. Also, several grooves 151 are arranged parallel to the axis X1 on the surface 141.

The central part 120 and the peripheral part 140 of the diaphragm 100 are connected by an intermediate part 160 which is able to have an elastic deformation when the shaft 40 transmits the force F1 to the central part 120. The intermediate part 160 is integrally formed with the central 120 and peripheral 140 parts. The part 160 has a wall 161 which runs transversally to the axis X1 from the surface 121, between the end 124 and the collar 131, to the peripheral part 140. More precisely, a transverse annular surface 162 connects the surfaces 121 and 146 on the side of the end 124, while transverse annular surfaces 163 and 164, connected by a bore 164, run from the surface 121 to the surface 147 on the side of the end 122 and the collar 131. In practice, the wall 161 has a thin portion on the surface 164 and a thick portion on the surface 163.

Figure 6:
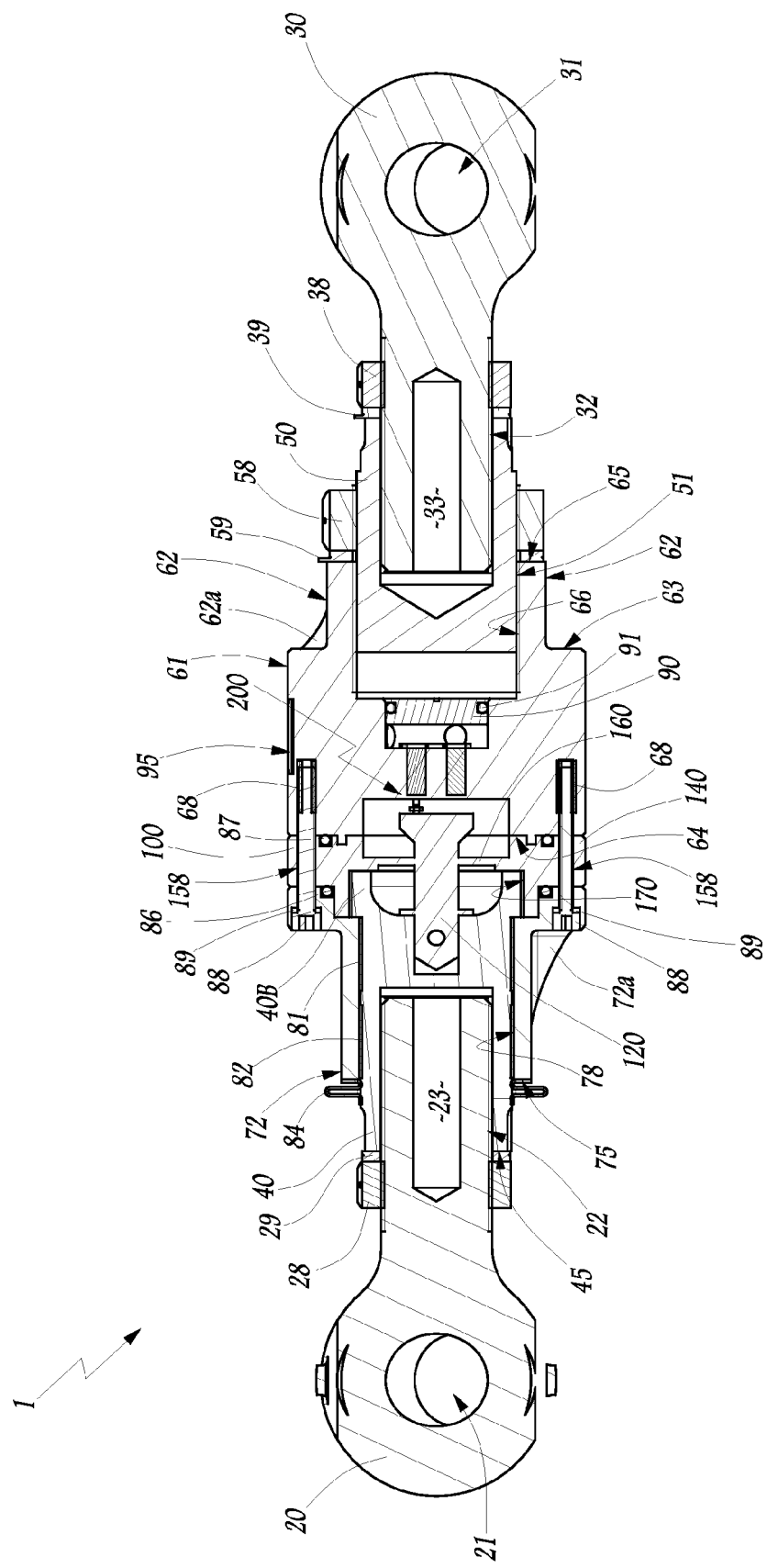

The elements 60, 70 and 100 are rigidly assembled using screws 88, as can be seen in FIGS. 3 and 6. More precisely, in an example, eight screws 88 penetrate into the cover 70, pass through the diaphragm 100 by passing through through-holes 158 parallel to the axis X1, and are fixed to added threading elements 68 which are housed in the case 60. A lock washer 89 is positioned under each screw head 88, in the cover 70. Each washer 89, in an example, is of the NORD-LOCK type (registered trademark) in order to prevent the loosening of the screws 88 when the connecting rod 1 is in service. At this stage, note that the diameters of the surfaces 61, 71 and 141 are equal, in such a way that the elements 60, 70 and 100 have a single-piece exterior configuration when the connecting rod 1 is assembled.

A measurement system 200 is associated with the diaphragm 100. This system 200 is of the LVDT (linear variable differential transformer) type, configured to measure the displacement of the central part 120 in the form of an electrical signal that is proportional to the force of tension or of compression applied to the connecting rod 1. More precisely, the system 200 can include two displacement sensors 201 and 202, of which the details are provided hereinafter.

At this stage, note that certain existing connecting rods include strain gauges. These gauges have parts that are sensitive to the deformations making it possible to measure these deformations. Because of this, the assembly constraints must be anticipated and the measurement system has to be adjusted after it is assembled on the aircraft. Moreover, the reliability of the measurement systems that incorporate these gauges is intrinsically lower. Indeed, the gauges are commonly glued (risk linked to the process) and the output signal must be analyzed by a processing chain comprising several electronic components (risk linked to the equipment).

However, the connecting rod 1 is provided with LVDT displacement sensors which have a higher degree of reliability than strain gauges. Each sensor 201 and 202 is fixed to the diaphragm and configured to measure substantially axial low mechanical deformations, for example with an accuracy of about 20 μm in the operating conditions of the connecting rod 1. This method is particularly reliable and accurate.

In practice, each sensor 201 and 202 can be a displacement sensor, and the rigidity of the deformable element is constant, which makes it possible to determine the force F1 by simple linear transformation using a displacement measurement of the central part 120. By way of example, each sensor 201 and 202 is configured to operate with a nominal detection load of about a few kilonewtons, a measurement range for the forces of about a hundred kilonewtons, a temperature range between −55° C. to +70° C., and an electrical consumption less than 5 W.

As can be seen in FIG. 9, the sensor 201 is partially housed in an orifice 181 arranged in the end 124 of the diaphragm 100, while the other end of the sensor 201 is positioned in an element 221 comprising a winding. As such, during the displacement of the end 124, the sensor 201 is displaced in translation parallel to the axis X1 in the element 221 with a course of travel of a magnitude of the millimeter, for example equal to ±1 mm, in such a way that the displacement is measured and sent to the electrical connector 231 by the intermediary of a cable 241, as can be seen in FIG. 7. The element 221 is rigidly fixed in the case 60, for example using an added threading element, while the sensor 201 is fixed in the orifice 181 by a nut 211.

Figure 8:
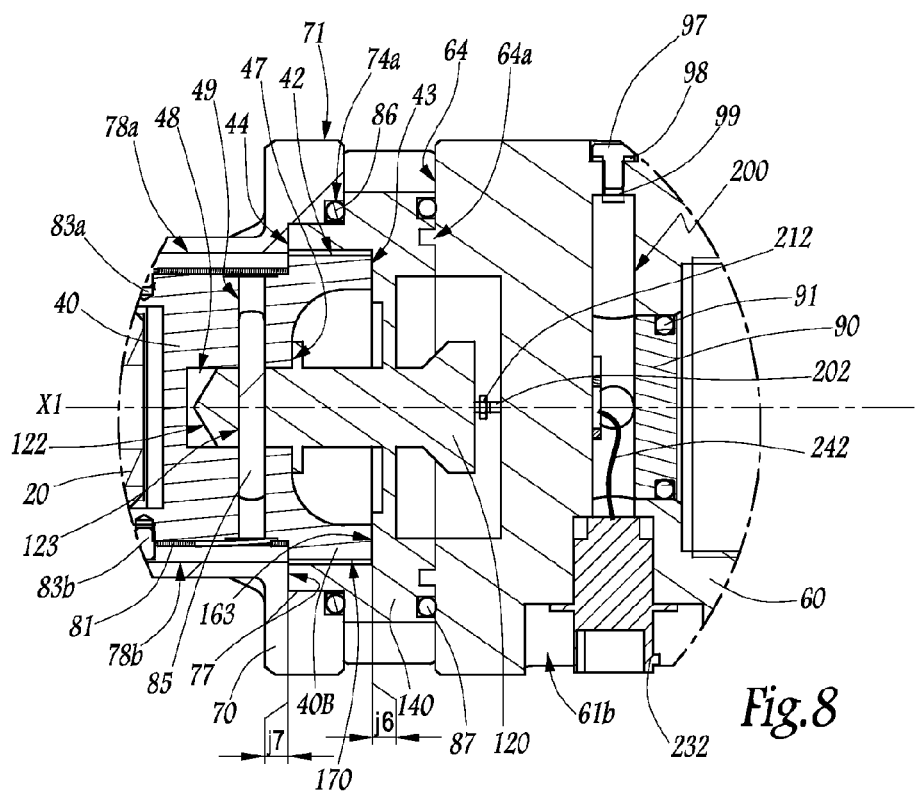

Likewise, the sensor 202 is partially housed in an orifice 182 arranged in the end 124 of the diaphragm 100, while the other end of the sensor 202 is positioned in an element 222 comprising a winding. As such, during the displacement of the end 124, the sensor 202 is displaced in translation parallel to the axis X1 in the element 222 with a course of travel of a magnitude of the millimeter, in such a way that the displacement is measured and sent to the electrical connector 232 by the intermediary of a cable 242, as can be seen in FIG. 8. The element 222 is rigidly fixed in the case 60, for example using an added threading element, while the sensor 202 is fixed in the orifice 182 by a nut 212.

Furthermore, the sensors 201 and 202 are closer to the longitudinal axis X1 than the periphery of the connecting rod 1, i.e. surfaces 61, 71 and 141. Also, advantageously but not mandatory, the sensors 201 and 202 are positioned substantially at the center of the connecting rod 1 along the longitudinal axis X1, in particular between 45% and 55% of the total length of the connecting rod 1 in question along the longitudinal axis X1. Indeed, such an arrangement makes it possible to jointly improve the accuracy of the measurement, protect the measurement system 200 and reduce the encumbrance of the connecting rod 1.

In fact, the two sensors 201 and 202 of the system 200 are provided, on the one hand, to send analogue signals towards two independent electronic systems separated from the connecting rod 1 and, on the other hand, to increase the reliability of the measurement of the system 200.

In an alternative not shown, the measurement system 200 can incorporate a single sensor 201, centered or not centered on the axis X1.

According to another alternative not shown, the measurement system 200 can incorporate more than two sensors 201 and 202, for example three or four sensors housed at least partially in the central part 120 of the diaphragm 100.

Moreover, the system 200 is housed in a sealed chamber 205 constituted of two parts 206 and 207. The part 206 is delimited in the case 60, while the part 207 is delimited between the case 60 and the diaphragm 100. The seal of the part 206 is provided, on the one hand, by a cap 90 provided with an O-ring gasket 91 and, on the other hand, by gaskets not shown. In particular, these seals are arranged under the electrical connectors 231 and 232 and under a screw 97 mounted in the case 60, with a washer 98 and an added threading element 99. The seal of the part 207 is provided by the O-ring gasket 87 and the wall 161 of the diaphragm 100.

Moreover, the connecting rod 1 is provided with the bellows 84 and with the seal 86, the mobile elements 40 and 120 as well as the system 200 are protected against the intrusion of fluids and solid materials.

Details on the various operating modes of the connecting rod 1 are provided hereinafter.

When the connecting rod 1 is in service according to a normal operating mode, it is subjected to the tension/compression forces F1 of moderate intensity, which are transmitted from the tip 20 to the peripheral part 140 of the diaphragm 100 via the shaft 40, then from the case 60 to the tip 30 via the shaft 50. In this case, the intermediate part 160 of the diaphragm 100 is deformed elastically, and the system 200 measures the displacement of the central part 120 of the diaphragm 100.

On the side of the cover 70, the first shaft 40 includes an abutment 40B which runs radially from the axis X1 towards the peripheral part 140. The abutment 40B has a cylindrical symmetry of axis X1, with support surfaces 43 and 44 which are planar, perpendicular to the axis X1 and opposite, i.e. one turned towards the tip 20 and the other towards the tip 30.

The cover 70 is positioned in planar contact with the peripheral part 140 of the diaphragm 100, to which the cover 70 is made integral by the intermediary of the screws 88. More precisely, the cylindrical surface 142 is housed in the bore 76, while the transverse surfaces 74 and 143 are mutually pressing against one another. As such, the assembly of the cover 70 with the peripheral part 140 defines a recess 170 which surrounds the abutment 40B of the shaft 40, as can be seen in particular in FIG. 8.

When the connecting rod 1 is at rest, i.e. when it is not subjected to any force of tension or of compression, the peripheral part 140 and the cover 70 are at a distance from the shaft 40. More precisely, as shown in FIG. 8, a clearance j6 is present between the surfaces 43 and 163, while a clearance j7 is present between the surfaces 44 and 77. In other terms, the abutment 40B can be displaced axially in the recess 170, with this displacement being limited by the clearance j6 on one side and the clearance j7 on the other side, but cannot escape from this recess 170 after the assembly of the connecting rod 1.

When the connecting rod 1 is in service and when it is subjected to moderate forces F1, the intermediate part 160 is deformed elastically, which results in a displacement of the central part 120 and of the sensors 201 and 202, which makes it possible to evaluate the forces F1.

In normal or failing operation, the intensity of the forces applied to the connecting rod 1, here the force of compression F1, can become very high, for example in the event of an impact. In this case, the elastic deformation of the intermediate part 160 affected can exceed a predetermined limit.

As soon as this limit is exceeded, the abutment 40B prevents the movement of the shaft 40 in the direction of the force F1. More precisely, the surface 43 of the abutment 40B comes to press against the surface 163 of the diaphragm 100 in one direction, or the surface 44 of the abutment 40B comes to press against the surface 77 of the cover 70 in the other direction. As such, the mechanical constraints that the part 160 is subjected to are limited to the constraints corresponding to this limit of elastic deformation. The excess portion of the force F1 is transmitted from the shaft 40 to the peripheral part 140 or to the cover 70, while the parts 120 and 160 support a limited portion of the force F1. In other terms, the abutment 40B fulfils a function of mechanical safety which "short-circuits" the intermediate part 160 in order to transmit substantial forces from the shaft 40 to the peripheral part 140.

At this stage, note that the abutment 40B has a cylindrical symmetry and that the support surfaces 43 and 44 are planar, axial and opposite i.e. one turned towards the tip 20 and the other towards the tip 30.

In an alternative not shown, the support surfaces 43 and 44 of the abutment 40B can have other shapes, for example planar and inclined on the axis X1 at a slant. In this case, the complementary support surfaces 163 and 77 have an adapted shape.

When the connecting rod is at rest, the surfaces 43 and 163 are separated by a distance which is equal to the clearance j6 and less than the limit of elastic deformation provided for the intermediate part 160. Consequently, no force is transmitted between the support surfaces 43 and 163, nor therefore between the peripheral part 140 and the shaft 40, while the elastic deformation of the intermediate part 160 in the longitudinal direction defined by the axis X1 remains less than this limit. Likewise, the surfaces 44 and 77 are separated, when the connecting rod 1 is at rest, by a distance which is equal to the clearance j7 and less than this limit. Consequently no force is transmitted between the support surfaces 44 and 77, nor therefore between the peripheral part 140 and the shaft 40, as long as the elongation of the intermediate part 160 in the longitudinal direction defined by the axis X1 remains less than this limit.

When the connecting rod 1 works in tension, the support surfaces 44 and 77 come closer together and the clearance j7 is reduced. On the contrary, when the connecting rod 1 works in compression, the support surfaces 43 and 163 come closer together and the clearance j6 is reduced.

When the desired limit of force on the intermediate part 160 is exceeded in tension, the support surfaces 44 and 77 come into contact and transmit, from the shaft 40 to the peripheral part 140 and to the case 60, the force F1 of which the intensity has become too high to carry out its transmission solely via the intermediate part 160.

Inversely, when the desired limit of force in compression is exceeded, the support surfaces 43 and 163 come into contact and then transmit from the shaft 40 to the peripheral part 140 and to the case 60 the forces of compression of which the intensity is too high for the intermediate part 160 alone.

As such, the support surfaces 43 and 44 form means of abutment able to react to forces transmitted by the surfaces 163 or 77.

The support surfaces 43, 44, 163 and 77 therefore make it possible to protect the intermediate part 160 of the diaphragm 100 by saving it from any plastic deformation and critical solicitation in stress. The forces supported by the connecting rod 1 in normal operation can as such be determined, without risking damage to the diaphragm 100 in failing operation.

In practice, by way of a non-restricted example, the clearances j6 and j7 are initially equal to a few tenths of a millimeter. At this stage, note that the diaphragm 100, and in particular the intermediate part 160, is advantageously made of high-strength stainless steel. As such, the diaphragm 100 has more preferably an elastic resistance Re between 800 and 1200 MPa and a resistance to rupture Rm between 900 and 1,200 MPa.

Alternatively, the diaphragm 100 can be made from any type of material with a high modulus of longitudinal elasticity (Young's modulus), such as titanium (Ti). High modulus of longitudinal elasticity means a modulus greater than 100,000 MPa. However, the use of titanium requires longer machining time due to the constraints that are intrinsic to this material.

The choice of the material and the dimensioning of the intermediate part 160 make it possible to obtain a relatively substantial elastic deformation, which increases the accuracy of the measurement of the forces F1 that the connecting rod 1 is subjected to. However, the more the part 160 has to be deformed, the more its deformation risks approaching the plastic zone. However, the abutment 40B, the cover 70 and the peripheral part 140 provide in this case the protection of the part 160.

The desired limit of force on the part 160 is here selected, in traction and in compression, in such a way as to be reached for a force greater than that for the abutting of the "short circuit" mentioned hereinabove. In practice, this limit force can be defined as being of a magnitude of a hundred or so kilonewtons. In the normal operating range of the connecting rod 1, where the forces are between −25 kN and +25 kN, the part 160 procures an accuracy of a magnitude of a few kilonewtons in the determination of the forces transmitted by the part 160. Moreover, the dimensioning of the abutment 40B, of the cover 70 and the peripheral part 140, i.e. the dimensioning of the support surfaces 43, 44, 163 and 77, allows them to transmit forces reaching several hundreds of kilonewtons.

As such, the connecting rod 1 is adapted to take accurate measurements of the forces during normal operation, and protect the elements that it is comprised of during a failing operation. In practice the measurement means, including in particular the elements 201, 202, 221 and 222, are measurement means of displacement, configured to determine the forces using the displacement of the deformable element. The arrangement of the measurement system 200 and of the deformable element 100 procure substantial advantages in terms of reliability and of resistance, all throughout the life cycle of the connecting rod 1.

In an alternative not shown, the connecting rod comprises a central case 60, as well as two units arranged symmetrically in relation to the case 60 along the axis X1. Each unit comprises a cover 70, a diaphragm 100, a shaft 40 and a tip 20. In addition, each unit comprises a measurement system 200 which includes one or several sensors 201 and 202. In other words, the connecting rod comprises two diaphragms 100, each provided with one or several sensors which are at least partially housed in its central part 120.

The invention claimed is:

1. A connecting rod for aeronautical actuating system, comprising:
   one shaft configured to transmit forces applied essentially in at least one of tension and compression along a longitudinal axis of the connecting rod when the connecting rod is in service,
   an elastically deformable element connected to the shaft and configured to react to the forces applied to the shaft and to elastically deform under the effect of the forces, the deformable element comprising a peripheral part rigidly connected to a member of the connecting rod wherein the shaft is slidably mounted, and
   a measurement device associated with the deformable element and configured to determine the forces, and at least partially housed in the deformable element,
   wherein the deformable element further comprises:
   a central part elongate along the longitudinal axis of the connecting rod, which is rigidly connected to the shaft and in which the measurement device is partially housed, and an intermediate part running transversally to the central part and connects the central part and the peripheral part.

2. The connecting rod according to claim 1, wherein the central part, the peripheral part and the intermediate part of the deformable element are integrally formed.

3. The connecting rod according to claim 1, wherein the measurement device includes at least one linear displacement sensor, the sensor being at least partially housed in the deformable element.

4. The connecting rod according to claim 1, wherein the measurement device includes at least two linear displacement sensors positioned parallel to one another on either side of the longitudinal axis of the connecting rod, with each sensor being at least partially housed in the deformable element.

5. The connecting rod according to claim 4, wherein each sensor is rigidly fixed to the deformable element and mobile in a complementary element configured to transform a displacement measurement of the sensor into a value of forces applied to the deformable element.

6. The connecting rod according to claim 1, wherein the measurement device is closer to the longitudinal axis of the connecting rod than to the periphery of the connecting rod.

7. The connecting rod according to claim 1, wherein the shaft is arranged slidingly in the member which is rigidly connected to the peripheral part of the deformable element, such that a displacement of the shaft under the effect of the forces results in a displacement of the central part of the deformable element.

8. The connecting rod according to claim 1, wherein the shaft comprises one or more abutment components disposed at a distance from the member and from the deformable element when the connecting rod is at rest and, configured to limit the forces applied in tension and/or in compression on the deformable element when the elastic deformation exceeds a determined limit, in such a way as to transmit the excess portion of the forces.

9. The connecting rod according to claim 1, wherein the deformable element is made of high-strength stainless steel or of titanium.

10. The connecting rod according to claim 1, further comprising a central case and two units arranged symmetrically in relation to the case along its longitudinal axis, with each unit comprising a deformable element, a shaft and a measurement device.

11. An aeronautical mechanism, comprising at least one connecting rod according to claim 1, wherein the connecting rod is interposed between a rotary actuator and a flap panel so as to transfer force from the rotary actuator and the flap panel, and wherein the aeronautical mechanism is configured to move the flap panel and hold it in extreme or intermediary positions.

12. Connecting rod according to claim 3, wherein the sensor is rigidly fixed to the deformable element and mobile in a complementary element configured to transform a displacement measurement of the sensor into a value of forces applied to the deformable element.

* * * * *